Patented July 28, 1925.

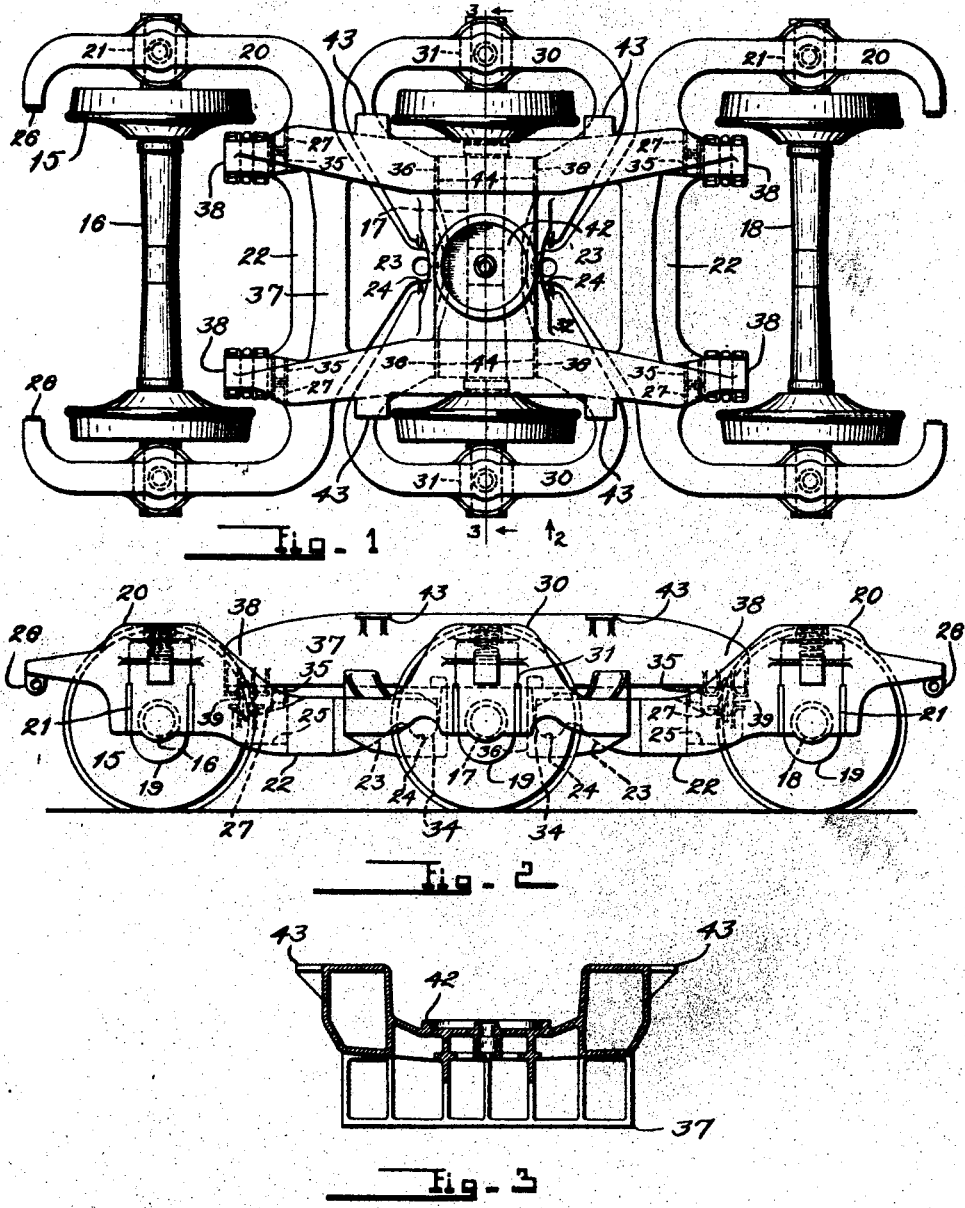

1,547,795

UNITED STATES PATENT OFFICE.

PAUL W. DAY, OF BALTIMORE, MARYLAND, ASSIGNOR, BY MESNE ASSIGNMENTS, TO HERBERT M. BRUNE, CHARLES E. SCARLETT, AND JANON FISHER, TRUSTEES, ALL OF BALTIMORE, MARYLAND.

RAILWAY-CAR TRUCK.

Application filed August 30, 1923. Serial No. 660,122.

*To all whom it may concern:*

Be it known that I, PAUL W. DAY, a citizen of the United States, residing at Baltimore, in the State of Maryland, have invented certain new and useful Improvements in Railway-Car Trucks; and I do hereby declare the following to be a full, clear, and exact description of the invention, such as will enable others skilled in the art to which it appertains to make and use the same.

My invention relates to railway car trucks.

My improved car truck comprises six wheels mounted upon three axles and each axle is revolubly mounted in a member. The pilot and trailer members are connected to the central member by what is substantially a ball and socket joint so that each member may move vertically and transversely horizontally without producing a corresponding movement of either or both of the other members.

Means are also provided for producing a horizontal coordinating action of the wheels and journals so that the wheels will conform to the contour of the rails, whatever it may be, and so that the angular position of the central axle will be coordinated to the position of either or both the pilot and trailer axles.

The horizontal coordinating action involved in my improved truck is clearly illustrated and explained and the method and means by which said action is effectuated is set forth in U. S. Letters Patent #1,341,776, issued June 1, 1920.

In combination with the horizontal coordinating action just referred to, my improved truck involves equalized vertical actions of the several members of the truck, and the method of accomplishing the horizontal coordinating action of the truck members in combination with an equalized vertical action thereof is set forth in U. S. Letters Patent #1,341,777, issued June 1, 1920.

In the last-named Letters Patent there is also set forth one means for effecting the horizontal coordinating action of the several members in combination with an equalized vertical action thereof.

Among the objects of my invention are:—

To produce a truck having a member which acts to coordinate the mutual angularity of the axles in a horizontal plane and at the same time serves to transmit the load stress from the car body to the axles and which is provided with two side bearings on each side thereof for the reception of vertical load stresses from the car body and with a center plate for the reception of the king pin attached to the car body.

One example of my improved truck is shown in the accompanying drawing for purposes of illustration.

Fig. 1 is a plan view of a six wheel truck constructed according to my invention.

Fig. 2 is a view of the truck shown in Fig. 1 looking in the direction of the arrow 2 in said figure.

Fig. 3 is a section along the line 3—3 in Fig. 1 looking in the direction of the arrows.

In the drawings:—

15 represents the wheels and 16, 17 and 18 represent, respectively, the pilot, central and trailer axles. The journals of the axles are mounted in any approved form of axle box such as 19 and the axles and wheels are of American Railway Association standards. Each pilot and trailer bolster consists of a pair of pedestals such as 20, each pedestal being provided with a recess having jaws 21 for the reception of the axle box 19. The pedestals 20 of each end member are joined together by a frame 22 and said frame is provided with an extension 23 terminating in a boss 24 having a hemispherical lower surface. The frame 22 is provided with bases 25—25 for the support of the friction reducing elements hereinafter referred to and with ears 26—26 for the support of brake shoes.

The frame 22 is provided with rocker bearings 27—27.

The central bolster consists of pedestals such as 30—30 each pedestal being provided with a recess 31 for the reception of the axle box 19 which slides freely therein.

The pedestals 30—30 of the central bolster are joined together by the frame 32 and said frame may be provided with ears for the support of brake shoes.

The frame 32 is provided on each side with sockets 34—34 having hemispherical bottoms; one of the bosses 24 is introduced in each of the sockets 34 and serves to connect the corresponding pilot and trailer bolster with the central bolster. The frame 32 is provided with four surfaces 36.

The coordinating plate 37 is provided with four bearings 35 which contact with the rocker bearings 27. The bearings 35 are formed upon the arms 38 of the coordinating plate 37 which also extends over the friction reducing element 39.

Each friction reducing element 39 rests upon a base 25 and the corresponding arm 38 of the coordinating plate 37 rests upon the top of said element.

The coordinating plate is provided with a center plate 42 which is to be connected to the car body in any approved manner and said plate is further provided with four gibs 44 finished on the outer surface thereof which project downwardly and each has a sliding bearing on the surfaces 36 of the frame 32, thus connecting the coordinating plate and the central bolster together in such manner that while the former can have angular movements in a vertical plane and vertical and transverse movements with reference to the latter, yet the latter is forced to partake of the angular movement in a horizontal plane of the former.

All of the parts hereinbefore referred to are fully illustrated, described, and the novel combinations thereof claimed in the application for Letters Patent of Cromwell, Day and Borup, Serial Number 650,644, filed July 10, 1923, for railway car trucks.

The coordinating plate 37 is provided with two side bearings 43 on each side thereof.

It is to be noted that I employ two side bearings on each side of the coordinating plate 37 in order that vertical load stresses may be communicated from the car body to the truck through four side bearings instead of through two side bearings as has heretofore been the practice. By increasing the number of side bearings upon the coordinating plate I prevent deformation of the underframe of the car body by the vertical load stresses.

While I have shown an increased number of side bearings as applied to the coordinating plate of a coordinating six wheel truck, it is to be understood that this is for purposes of illustration only. The coordinating plate 37 is to be considered as representative of any member that includes a center plate and a plurality of side bearings on each side of said member and that receives the vertical load stresses from the car body and transmits same to the axles, whether said member be employed in a flexible or rigid truck and whether said truck have more or less than six wheels.

While I have shown locations for the side bearings on each side of the coordinating plate, yet this placement of said bearings is not to be considered as limiting the invention to the locations shown, for many changes may be made in the locations of said side bearings without departing from the spirit of my invention.

I claim:—

1. In a six wheel truck, the combination with a bolster for each pair of journals, a coordinating plate engaging with the central bolster and with each of the pilot and trailer bolsters to control the mutual angularity of said journals, and with the pilot and trailer bolsters to transmit the load stress thereto, and a ball and socket joint between each of said pilot and trailer bolsters and said central bolster to transmit the load stress to said central bolster; said coordinating plate having a plurality of side bearings on each side thereof for receiving load stress from the car body.

2. In a six wheel truck, the combination with a bolster for each pair of journals, a coordinating plate engaging with the central bolster and with each of the pilot and trailer bolsters to control the mutual angularity of said journals, and with the pilot and trailer bolsters to transmit the load stress thereto, and a ball and socket joint between each of said pilot and trailer bolsters and said central bolsters; to transmit the load stress to said central bolster; said coordinating plate having a center plate for engaging the king pin on the car body and a plurality of side bearings on each side thereof for receiving load stress from the car body.

In testimony whereof, I affix my signature.

PAUL W. DAY.